(12) United States Patent
Gudan et al.

(10) Patent No.: US 8,155,121 B2
(45) Date of Patent: Apr. 10, 2012

(54) DETECTION OF PHYSICAL MOVEMENT FOR DOCUMENT SHARING

(75) Inventors: Kenneth F. Gudan, Sunnyvale, CA (US); John W. Barrus, Menlo Park, CA (US); Kurt W. Piersol, Campbell, CA (US); Sergey Chemishkian, Cupertino, CA (US)

(73) Assignee: Ricoh Co. Ltd., Tokyo (JP)

( * ) Notice: Subject to any disclaimer, the term of this patent is extended or adjusted under 35 U.S.C. 154(b) by 1062 days.

(21) Appl. No.: 11/691,620

(22) Filed: Mar. 27, 2007

(65) Prior Publication Data

US 2008/0244752 A1 Oct. 2, 2008

(51) Int. Cl.
*H04L 12/28* (2006.01)
*H04L 12/56* (2006.01)

(52) U.S. Cl. ........ 370/392; 370/401; 370/912; 345/156; 726/26; 726/27; 709/238

(58) Field of Classification Search .................... 726/27
See application file for complete search history.

(56) References Cited

U.S. PATENT DOCUMENTS

| | | | |
|---|---|---|---|
| 2005/0212750 A1* | 9/2005 | Marvit et al. | 345/156 |
| 2005/0216867 A1 | 9/2005 | Marvit et al. | |
| 2007/0188323 A1* | 8/2007 | Sinclair et al. | 340/568.1 |
| 2007/0223476 A1* | 9/2007 | Fry | 370/392 |

OTHER PUBLICATIONS

Holmquist, Lars Erik, et al., Smart-Its Friends: A Technique for Users to Easily Establish Connections Between Smart Artefacts, Proceedings of UBICOMP 2001, Sep. 2001, Atlanta, GA, USA.

Hincklye, Ken, Bumping Objects Together as a Semantically Rich Way of Forming Connections Between Ubiquitous Devices, Proceedings of Ubicomp 2003, Oct. 12-15, 2003, Seattle, WA, USA.

Yatani, Koji, et al., Information Transfer Techniques for Mobile Devices by "Toss" and "Swing" Actions, Sixth IEEE Workshop on Mobile Computing Systems and Applications (WMCSA '04), Dec. 2004, pp. 144-151, UK.

Harrington, Nathan, Knock-based Commands for your Linux Laptop, Jul. 25, 2006, [online], [retrieved on Aug. 10, 2006]. Retrieved from the Internet <URL: http://www-128.ibm.com/developerworks/linux/library/l-knockage. html?ca=dgr-lnxw01Knock-Knock>.

* cited by examiner

*Primary Examiner* — Nathan Flynn
*Assistant Examiner* — Bryan Wright
(74) *Attorney, Agent, or Firm* — Patent Law Works LLP

(57) ABSTRACT

A system for using accelerometer-based detection of physical movement for document sharing provides easy and intuitive ways to securely share documents, even without passwords, between computing devices. The system of the present invention includes: at least two computing devices that each have a motion detection device capable of detecting sudden movements and generating a unique signature. The unique signature can then be used to generate signatures or shared secrets for controlling the transfer of data between devices. The motion detection device is capable of detecting sudden movement such as the tapping of the two computing devices together, tapping a stack of computing devices, tossing a computing device in the air. The system may optionally include an intermediary device such as a server for transferring the documents or files between computing devices such that only a small decryption key and file pointer is needed to share records between computing devices. The present invention also includes a novel method for accelerometer-based detection of movement for transferring data between computing devices.

24 Claims, 7 Drawing Sheets

US 8,155,121 B2

DETECTION OF PHYSICAL MOVEMENT FOR DOCUMENT SHARING

BACKGROUND OF THE INVENTION

The present invention relates to processing techniques for transferring data. More particularly, the present invention relates to systems and methods for using detection of physical movement for document sharing between computing devices.

The use and proliferation of computing devices has become widespread. In particular, there are a number of small computing devices such as personal digital assistants (PDAs), smart phones, tablet computers, digital cameras and laptop computers. Such portable computing devices often include different communication mechanisms such as Bluetooth®, WiFi or infrared. However, even though these devices have the capability to communicate with other devices, establishing communication is difficult, cumbersome and not secure. For example, many PDAs include infrared transceivers, but using them requires that the transceivers be aligned in line of sight, each device must be separately initiated, and passwords and codes must be exchanged or input by the user to create a secure connection between devices. Similarly, establishing a communications link between devices using WiFi or Bluetooth® is very cumbersome and requires a number of manual steps including registering the devices to each other, accessing the network, locating the other machine, and each of these steps must be performed manually with input from the user.

While email can be used to transfer data and files between devices, it requires such devices have an email client and a transmission mechanism. However, a greater problem is that typing an e-mail address into a phone or a PDA with a touch pad is error-prone and slow. Thus, email is not a simple and effective way to transfer files. Furthermore, there are security concerns with email.

Some devices, like memory sticks, include other interfaces such as a universal serial bus (USB) connector. In an old fashioned manual file transfer way, such memory sticks can be manually connected to a device, files transferred to the memory stick, the memory stick removed, the memory stick manually connected to a second device and the files loaded the second device. However, this manual process defeats many of the reasons for having hand-held, portable and easy to use computing devices.

Yet another problem with existing communication between computing devices is security. For example, in a wireless network there may be a number of devices coupled to an access point for a network. Thus, any files shared over the network will be accessible all devices, known and unknown, that are connected to the access point of the network. Rather than broadcasting data or making a file accessible over the network to many other devices, the user more often wants to transfer the document to a single recipient/user and thus a single device coupled to the network. Again, the existing art does not provide a mechanism to do that easily and intuitively without having to manually set up encryption, set a password, identify a recipient or a variety of additional steps that need to be done manually by the user.

SUMMARY OF THE INVENTION

The present invention overcomes the deficiencies of the prior art with systems and methods for using accelerometer-based detection of physical movement for document sharing between computing devices. The system is particularly advantageous because it provides easy and intuitive ways to securely share documents with other devices, even without passwords. In one embodiment, the system of the present invention includes: at least two computing devices that each have a motion detection device capable of detecting sudden movements and generating a unique signature or a shared secret. The unique signature can then be used for controlling the transfer of data between devices. In one embodiment, the motion detection device is capable of detecting sudden movement such as the tapping of the two computing devices together, tapping a stack of computing devices, tossing a computing device in the air. In another embodiment, the system includes an intermediary device such as a shared-records server for transferring the documents or files between computing devices such that only a small decryption key and file pointer is needed to share records between computing devices. The present invention also includes a novel method for accelerometer-based detection of movement for transferring data between computing devices.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
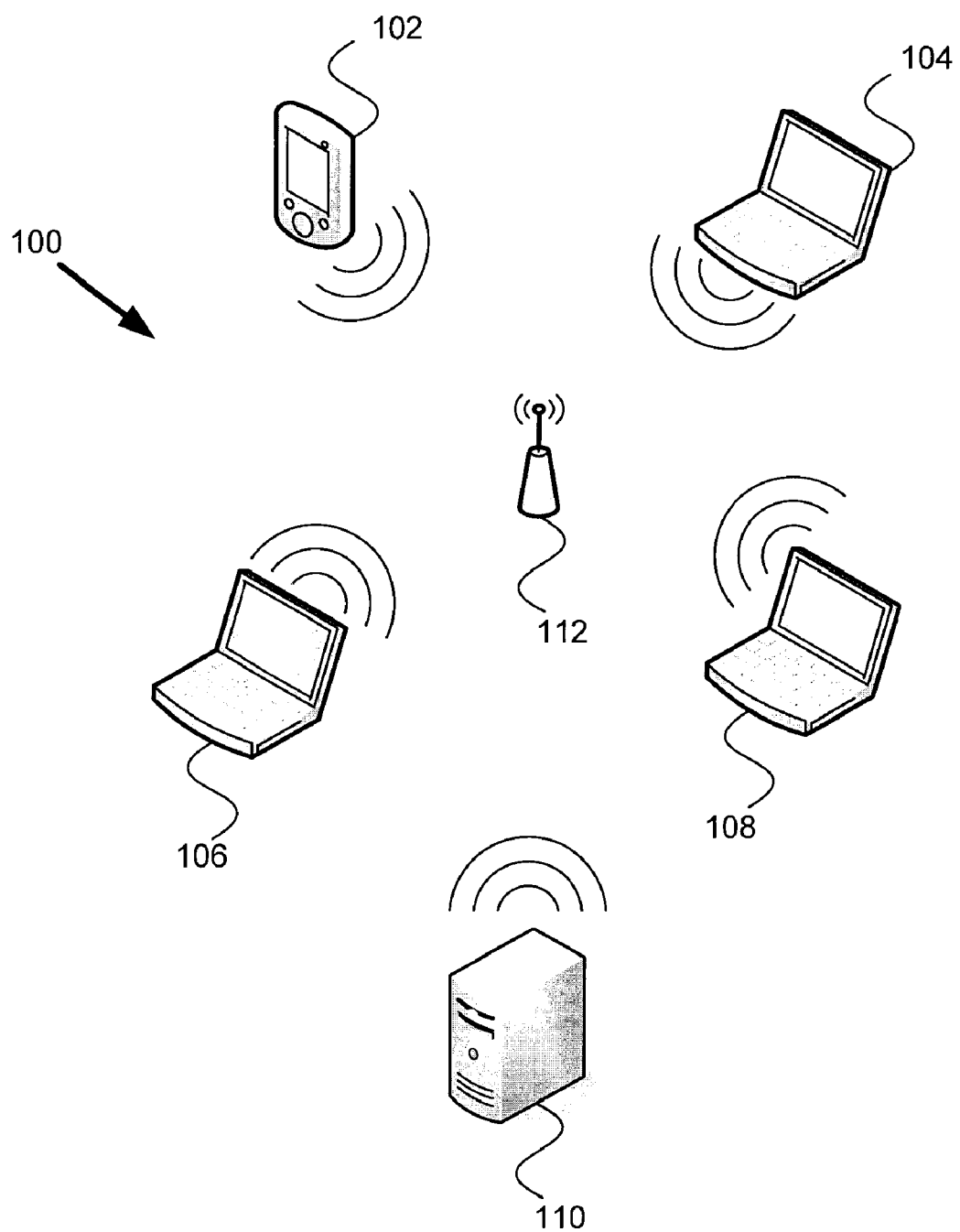
FIG. 1 is a block diagram of an embodiment of a system including a plurality of devices including the present invention.

A system and method for using accelerometer-based detection of physical movement for document sharing between computing devices is described. Throughout this patent application, the terms tapping or gesture are used interchangeably to refer to a sudden movement of a computing device. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to an embodiment where the first computing device is a PDA and the second device is a laptop, but the invention is applicable to any two computing devices that include a motion detection device.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

Referring now to FIG. 1, an embodiment of the system 100 of the present invention is shown. In this example embodiment, the system 100 comprises: a first computing device 102, a second computing device 104, a third computing device 106, a fourth computing device 108 and a server 110.

While the present invention will be described in the context of system 100 that includes the first computing device 102, the second computing device 104, the third computing device 106, the fourth computing device 108 and the server 110, this embodiment is used only for illustration purposes and the third computing device 106, the fourth computing device 108 and the server 110 are not required. In another embodiment, the system 100 only includes the first computing device 102 and the second computing device 104. In yet another embodiment, the system 100 includes the first computing device 102, the second computing device 104 and the server 110.

The system 100 of the present invention is particularly advantageous for a number of reasons. First, the system 100 provides an intuitive system and method of document sharing between portable electronic devices that is very similar to paper. As one would "give" paper to another, the system 100 allows the user to tap another device to share the document. It requires no learning, no manuals, no e-mail addresses and no passwords. It just happens, like sharing happens when a person hands paper or book documents to another person. In essence, the present invention provides a fusion between electronics and electronic files for document handling that mimics how paper documents are exchanged. Second, in the system 100 of the present invention, devices do not have to be registered with each other (they pre-register themselves to others in their environment automatically). Third, the system 100 of the present invention maintains security by sending decryption keys or files only to those devices which have a matching complimentary gesture or tap signature, for example, based on acceleration and timestamps as will be described below. Fourth, the system 100 of the present invention transfers files virtually "instantly" to the user because encryption keys and file pointers are typically a very small number of bytes.

As shown in FIG. 1, the first computing device 102, the second computing device 104, the third computing device 106, fourth computing device 108 and the server 110 are coupled to a wireless network (not shown) by an access point 112. The wireless network is only provided by way of example and system 100 requires only that there be a communication channel between the first computing device 102 and the second computing device 104. The network may comprise a local area network (LAN), a wide area network (WAN) (e.g., the Internet), and/or any other interconnected data path across which multiple devices may communicate. Indeed, document sharing of the present invention can take place with access to any form of communication network. The first computing device 102 and the second computing device 104 have conventional connections to other systems such as a network for distribution of files using standard network protocols such as TCP/IP, http, https, and SMTP as will be understood to those skilled in the art.

The first computing device 102 includes a control unit, memory, data storage, a display device, an input device, one or more other input/output (I/O) devices, a wireless transceiver and a network controller for coupling to a network. These components are coupled together in a conventional manner such as in a von Neumann architecture or similar architectures as will be understood to those skilled in the art to provide the basic functionality of the device as a cell phone, PDA or smart phone. In the example shown in FIG. 1, the first computing device 102 is a PDA. The first computing device 102 also includes a motion detection unit 300a (See FIG. 3) as will be described below in more detail. In one embodiment, motion detection unit 300a has its separate components as described below with reference to FIG. 3. In another embodiment, the motion detection unit 300a is integrated with the PDA using some of the same components as the first computing device 102 for its operations.

The second computing device 104, the third computing device 106 and fourth computing device 108 each include a control unit, memory, data storage, a display device, an input device, one or more other input/output (I/O) devices, a wireless transceiver and a network controller for coupling to a network. These components are coupled together in a conventional manner such as in a von Neumann architecture or similar architectures as will be understood to those skilled in the art to provide the basic functionality of a conventional computer. In addition, the second computing device 104, the third computing device 106 and fourth computing device 108 each include a motion detection unit 300b as is shown and described below with reference to FIG. 3. As with the motion detection unit 300a of the first computing device 102, the motion detection unit 300b can either be a separate component from their respective computing devices 104, 106, 108 or integrated with them reusing some components for dual purposes. In the example shown in FIG. 1, the second computing device 104, the third computing device 106 and fourth computing device 108 are laptop computers.

Figure 3:
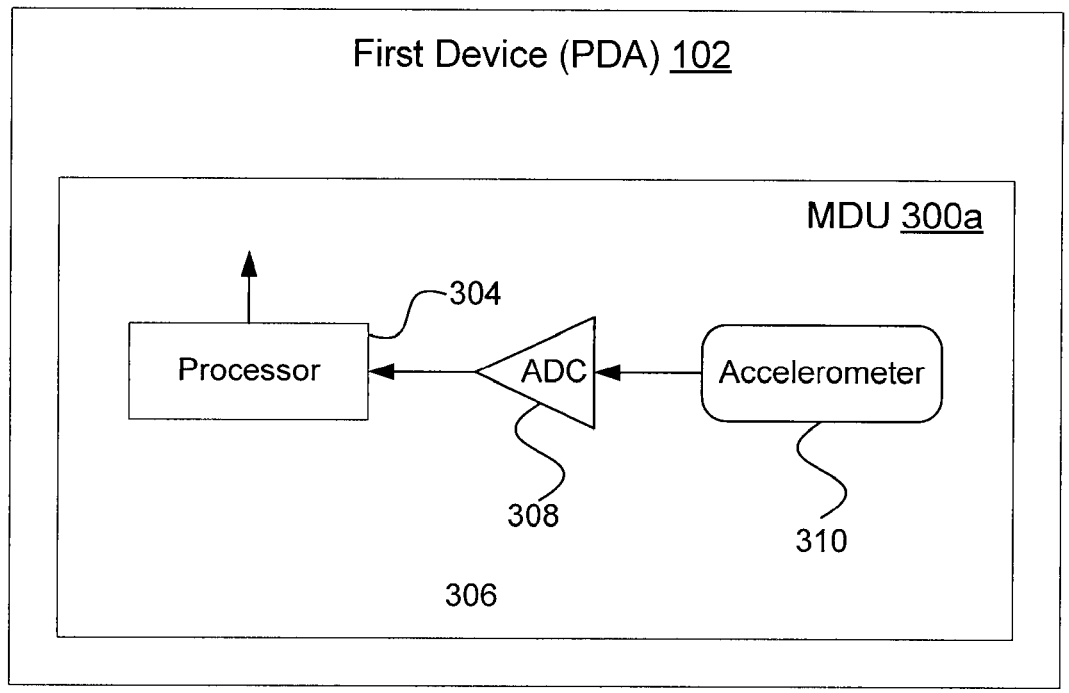
FIG. 3 illustrates a block diagram of an embodiment of a first device and a second device in accordance the present invention.
Figure 3:
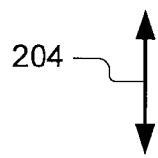
Figure 3:
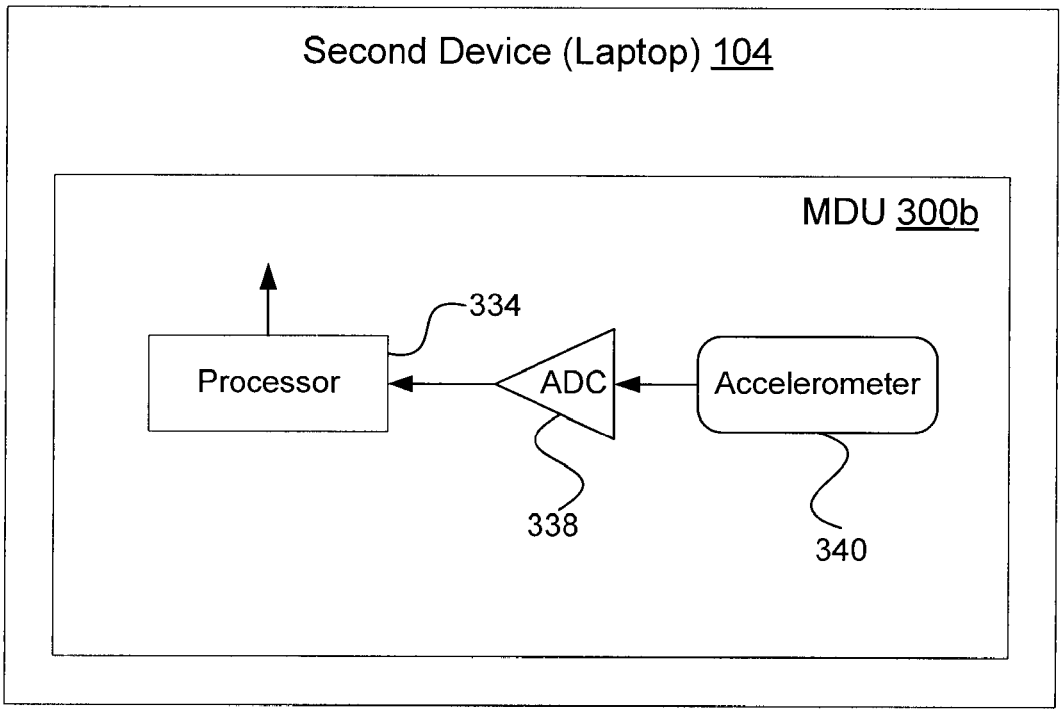

The first computing device 102, the second computing device 104, the third computing device 106 and fourth computing device 108 may include more or less components than those shown in FIG. 3 without departing from the spirit and scope of the present invention. For example, the first computing device 102, the second computing device 104, the third computing device 106 or fourth computing device 108 may include additional memory, such as, for example, a first or second level cache, or one or more application specific integrated circuits (ASICs). Similarly, additional input/output devices may be coupled to control unit including, for example, an infrared transceiver, digital still or video cameras, or other devices. One or more components could also be eliminated such as the network controller or their functionality can be performed in software stored in the memory.

The server 110 is a conventional server including connections to a wireless network and a conventional network. The server 110 includes a control unit, a memory, data storage, one or more other input/output (I/O) devices, a wireless transceiver and a network controller for coupling to a network. In another embodiment, the server 110 may also include a display device and an input device such as a keyboard and mouse-type controller. The server 110 also includes and operates conventional software for serving documents, maintaining a file system and establishing secure communication channels.

Figure 2:
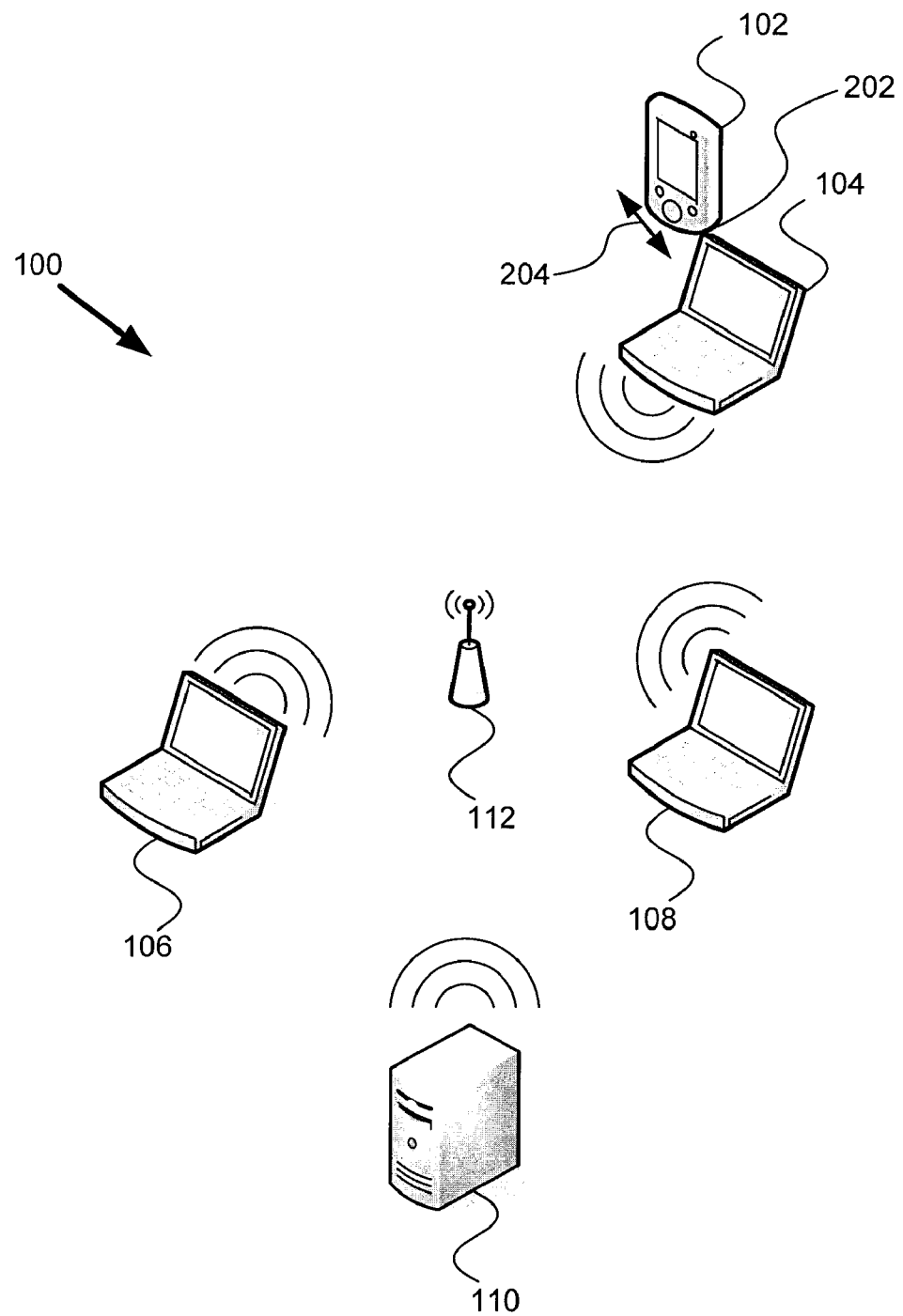
FIG. 2 illustrates a block diagram of the embodiment of the system of FIG. 1 with one of the plurality of devices making contact with another of the plurality of devices in accordance with the present invention.

FIG. 2 illustrates a block diagram of the embodiment of the system 100 of FIG. 1 with the first computing device 102 making contact with (being "tapped" against) the second computing device 104 in accordance with the present invention. The first computing device 102 is moved 204 such that the first computing device contacts or taps 202 the second computing device. This contact or tap is used as described below to create a tap signature that allows the secure transfer of data and files between only the devices 102, 104 that were tapped.

FIG. 3 illustrates a block diagram of an embodiment of the first computing device 102 and the second computing device 104 further illustrating the motion detection units 300a, 300b in accordance with the present invention. The motion detection unit 300a comprises a processor 304, an analog-to-digital converter (ADC) 308 and an accelerometer 310.

The processor 304 can be any one of a conventional type suitable for processing digital signals. In one embodiment, the processor 304 is independent from the processor of the first computing device 102. In another embodiment, the processor 304 is shared with or is the same as the processor of the first computing device 102. The processor 304 is capable of producing a tap signature from input provided by the location unit 306 and the ADC 308. More particularly, the processor 304 includes software to receive the signals from the accelerometer 310 through the ADC 308 and detect movement of the first computing device 102, acceleration of the first computing device 102, timing (timestamps), direction and magnitude. The digital parameters (acceleration, time) of the movement can be used to create the "signature" of the movement or a secret shared between multiple devices.

The analog-to-digital converter (ADC) 308 is a conventional converter for converting analog signals to digital ones. The ADC 308 has an input and an output. The input of the ADC 308 is coupled to the output of the accelerometer 310. The output of the ADC 308 is coupled to an input of the processor 304.

The accelerometer 310 is used provide detection and measurement of movement of the first computing device 102. In one embodiment, the accelerometer 310 is a 3D accelerometer. In particular, the accelerometer 310 is the ADXL330 (3D) manufactured and sold by Analog Devices, Inc. of Norwood, Mass. In another embodiment, the accelerometer 310 is a pair of 2D accelerometers. In particular, the accelerometer 310 is a pair of ADXL322 (2D) manufactured and sold by Analog Devices, Inc. of Norwood, Mass. The accelerometer 310 generates an analog signal in three axes. The output of the accelerometer 310 is input to the ADC 308 to digitize them into signals usable by the processor 304.

FIG. 3 also illustrates the second device 104 also including a motion detection unit 300b. The motion detection unit 300b includes a processor 334, a location unit 336, an analog-to-digital converter (ADC) 338 and an accelerometer 340. These components have a similar functionality as like named components described above with reference to the first computing device 102.

Figure 7A:
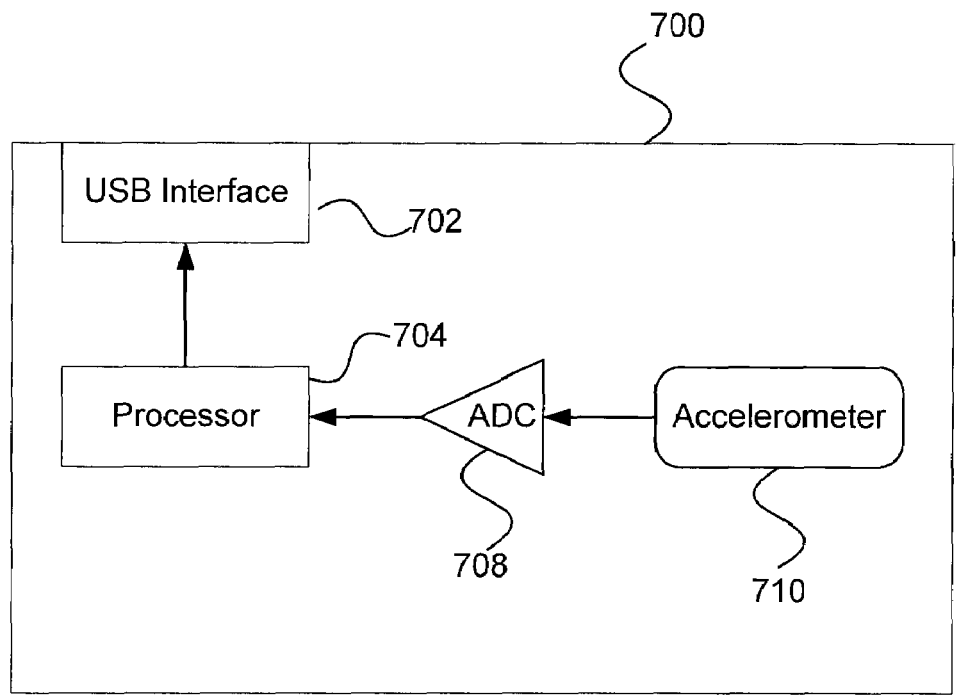
FIGS. 7A and 7B are additional embodiments of an apparatus for detecting movement in accordance the present invention.
Figure 7B:
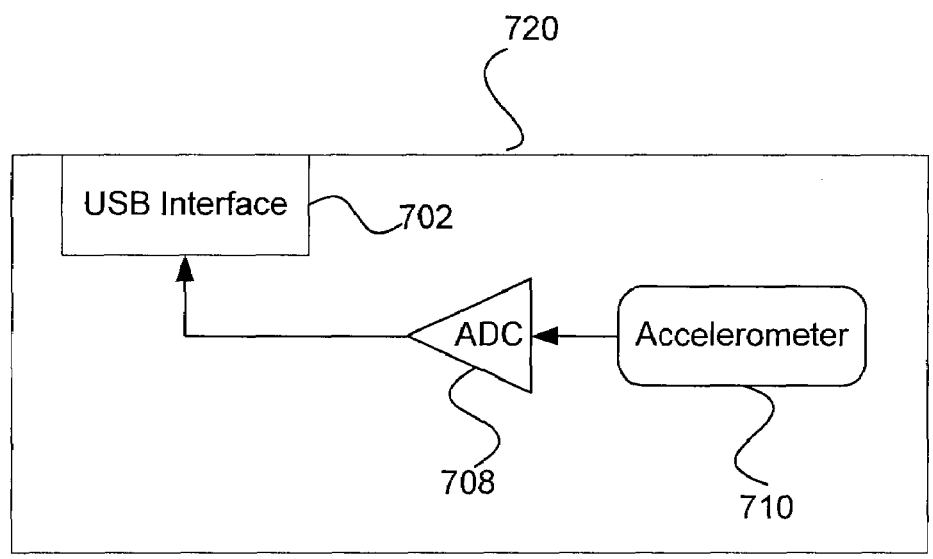

Referring now also to FIGS. 7A and 7B, additional embodiments for the motion detection devices 700 and 720 are shown. FIGS. 7A and 7B show the present invention as a stand alone device such as a dongle. In addition to these devices themselves, the system to which they are coupled in some cases requires software operating on that system. FIG. 7A shows an embodiment of the motion detection device 700 including an interface 702 such as for a universal serial bus (USB), a processor 704 an analog-to-digital converter (ADC) 708 and an accelerometer 710. The processor 704, analog-to-digital converter (ADC) 708 and accelerometer 710 have a similar functionality to that described above with reference to FIG. 3. However, in this embodiment the processor 704 communicates with another system (not shown) such as a laptop computer using the interface 702. This embodiment is particularly advantageous because it provides backward compatibility for existing systems that do not include an accelerometer, which is a virtually any device with an interface 702. FIG. 7B illustrates a minimalist embodiment that includes the interface 702, the analog-to-digital converter (ADC) 708 and the accelerometer 710. For this additional embodiment, the system would need to include additional software to perform the signature generation operations described above as being performed by processor 304.

Methods

Figure 4:
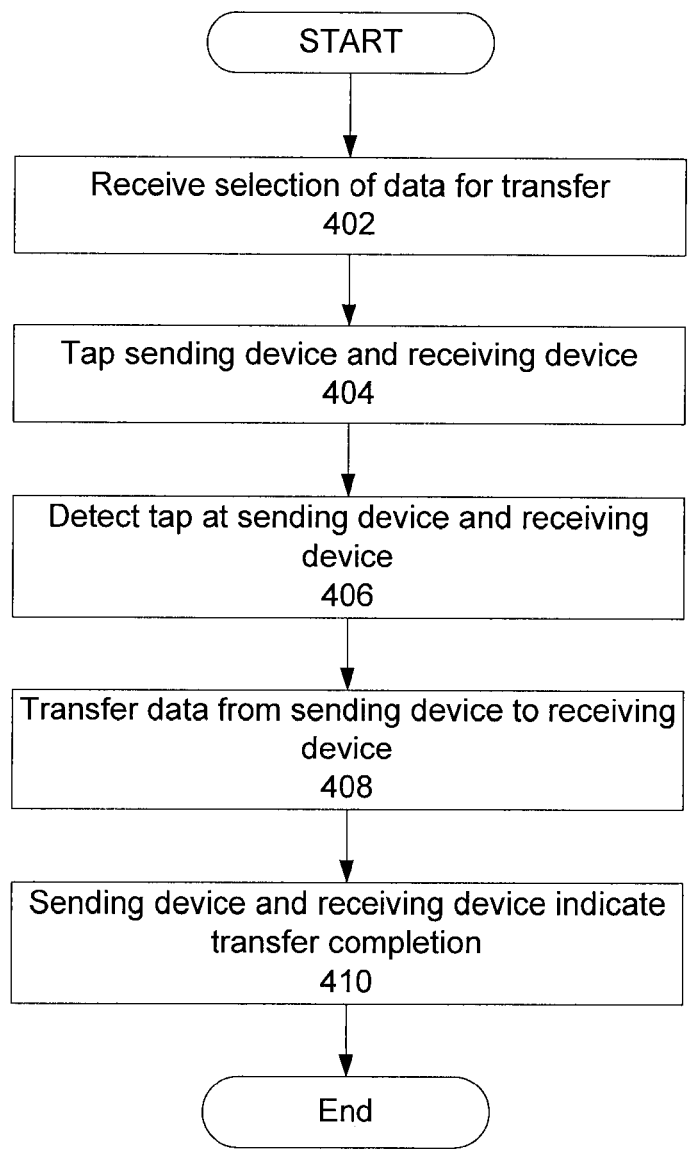
FIG. 4 is a flowchart of an embodiment of a method for transferring data between computing devices in accordance with the present invention.

Referring now to FIG. 4, an embodiment of a method for transferring data between computing devices 102, 104 in accordance with the present invention is shown. It is more intuitive to "give" documents to others, as people commonly do with paper documents today. However, portable computing devices, such at tablet PCs cost too much and have too much additional information/usefulness to actually physically give them to another person. So the present invention provides a simulated handoff, by using a physical gesture, such as a "tap", of the document to cause its transfer to the recipient. This gives the document to a recipient as one would give paper, without actually giving the valuable tablet device away. The method begins by receiving 402 a selection of data for transfer. For example, a user may open the document or select a document to highlight it for transfer. The user gestures 404 the sending device toward a receiving device by tapping the receiving device with the sending device. Next, the sending and receiving device automatically detects 406 the tap gesture. Then, the system 100 transfers 408 the data from the sending device to the receiving device. The method completes with the sending device and the receiving device indicating 410 data transfer has been completed. One advantage of the present invention is that the system 100 makes the transfer automatic without the user having to set up a connection, input a password, set security, etc. Behind the scenes, the method of the present invention does this automatically to make the transfer simple, obvious and as easy as possible for the user.

Figure 5:
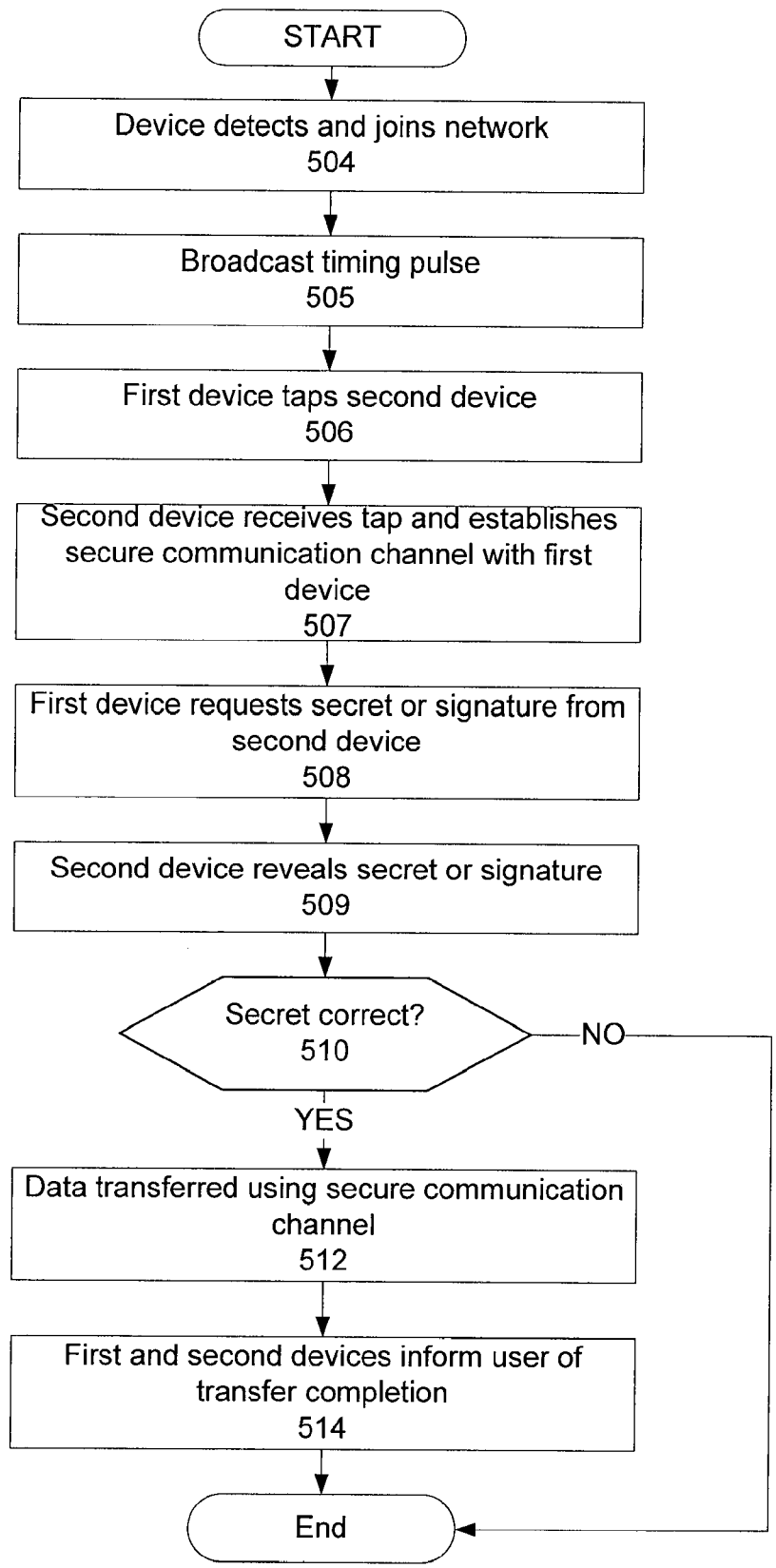
FIG. 5 is a flowchart of another embodiment of a method for transferring data between computing devices in accordance with the present invention.

Referring now to FIG. 5, another embodiment of a method for securely transferring data between computing devices in accordance with the present invention is shown. The method begins when the first device 102 detects and joins 504 the network. For example, the first device 102 automatically joins the WiFi network with all the local devices 104, 106, 108 and 110 in its environment.

In one embodiment, at step 505, the first device 102 broadcasts a timing signal or synchronization signal to all other devices. The timing signal is only necessary in order to synchronize the clocks on the other devices 102, 104, 106 and 108. The shared secret in one embodiment is the time of the tap, which is known only to the first 102 and second 104 devices. In order to be able to calculate the precise time of the tap, both devices must agree on the time. In one embodiment, when a timing signal is transmitted, the devices 102, 104, 106 and 108 begin counting milliseconds starting at 0. When a tap is sent or received, the current count is recorded and the shared secret becomes the time between the timing signal and the tap. Alternatively, the timing signal could be transmitted after the tap and the shared secret would then be the amount of time that elapsed between the tap and the broadcast timing signal. Additional information could be used as a shared secret, including the total number of taps or the time between multiple taps.

Then the user gestures 506 the first device 102 at or toward the second device 104. In one embodiment, a point-to-point document transfer may be established by tapping (a tap gesture) the two devices 102, 104 together. In this embodiment, the user gently taps the PDA 102 against the laptop 104. A tap, particularly double-tap or triple-tap, creates a "signature" of the event. In one embodiment, the "signature" includes timing, direction, acceleration and magnitude of the tap(s). Such a multiple-tap signature is virtually impossible to copy, thus providing the present invention excellent security. The sending device 102 knows the tap signature and it can interrogate all devices 104, 106 and 108 already established in its environment to find the one which has the same tap signature, and send the document, or the decryption key and file pointer, only to that device which matches, as will be described in more detail below. While the present invention is described in terms of a "tap" gesture, those skilled in the art will recognize that this is only by way of example. In this example, only the laptop 104 has the matching tap signature and will be able to prove to the PDA 102 that it is the correct recipient. The other devices 106 and 108 will not have the tap signature, and thus will not be able to prove to the PDA 102 that they received a tap. Any other gesture that generates a unique signature on both devices 102, 104 and can be limited to be received or detected by the two devices 102, 104 of interest can be used. For example, the gesture could be the sending user whispering a code word that can be detected by both devices. In one embodiment, the method loops back to step 505 and remains in that step until a tap is detected at which time it transitions from step 505 to 507.

Next, the second device 104 senses the tap 507 and establishes a secure communication channel with the device that broadcast the timing signal, the first device 102. The secure communication channel can be created preferably using the Diffie-Hellman key exchange protocol, which allows two devices to communicate securely. Any method of establishing a secure communication channel can be used to begin communication between the devices 102, 104. Many such secure communication channels are well known in the art.

Once the secure communication channel has been established, the first device 102 asks 508 the second device 104 for the shared secret. The second device 104 reveals 509 the shared secret. If the second device 104 reveals the correct secret 510 then data is transferred 512 to the second device 104 over the already established secure communication channel from the first device 102. After the data has been successfully communicated, the devices 102, 104 inform 514 the user of the successful data transfer.

Some documents are very large, and take a long time to transfer, even on today's higher speed wireless networks. The present invention is attempting to mimic paper, and thus includes methods and devices to make the document transmission to the recipient to be as fast and secure as one would hand a piece of paper or a whole book to another. In one embodiment, the system 100 includes the server 110 or other URL pointer from which devices can download files when requested. This means that devices 102, 104 needs only send very small decryption keys and file pointers between each other when gestures are sensed. Receiving devices would load the actual file from the server 110 using the file pointer and are able to view the document based on the decryption key.

To prevent the file pointer and decryption key from being sent to unintended devices, devices may be required to be in physical contact with each other. In this mode, two devices may be tapped, and the signature of that tap (acceleration, timestamp) can be compared for a match, and keys/pointers need only be shared between those devices which have identical signatures. Depending on the bandwidth of the accelerometer and ADC's involved, the single "tap" may actually have several high speed bounces which can be detected for a unique signature. If the bandwidth is insufficient to detect a unique signature with one tap, then a two-tap or three-tap sequence would be used, which is impossible to duplicate by other "listening" devices.

Figure 6:
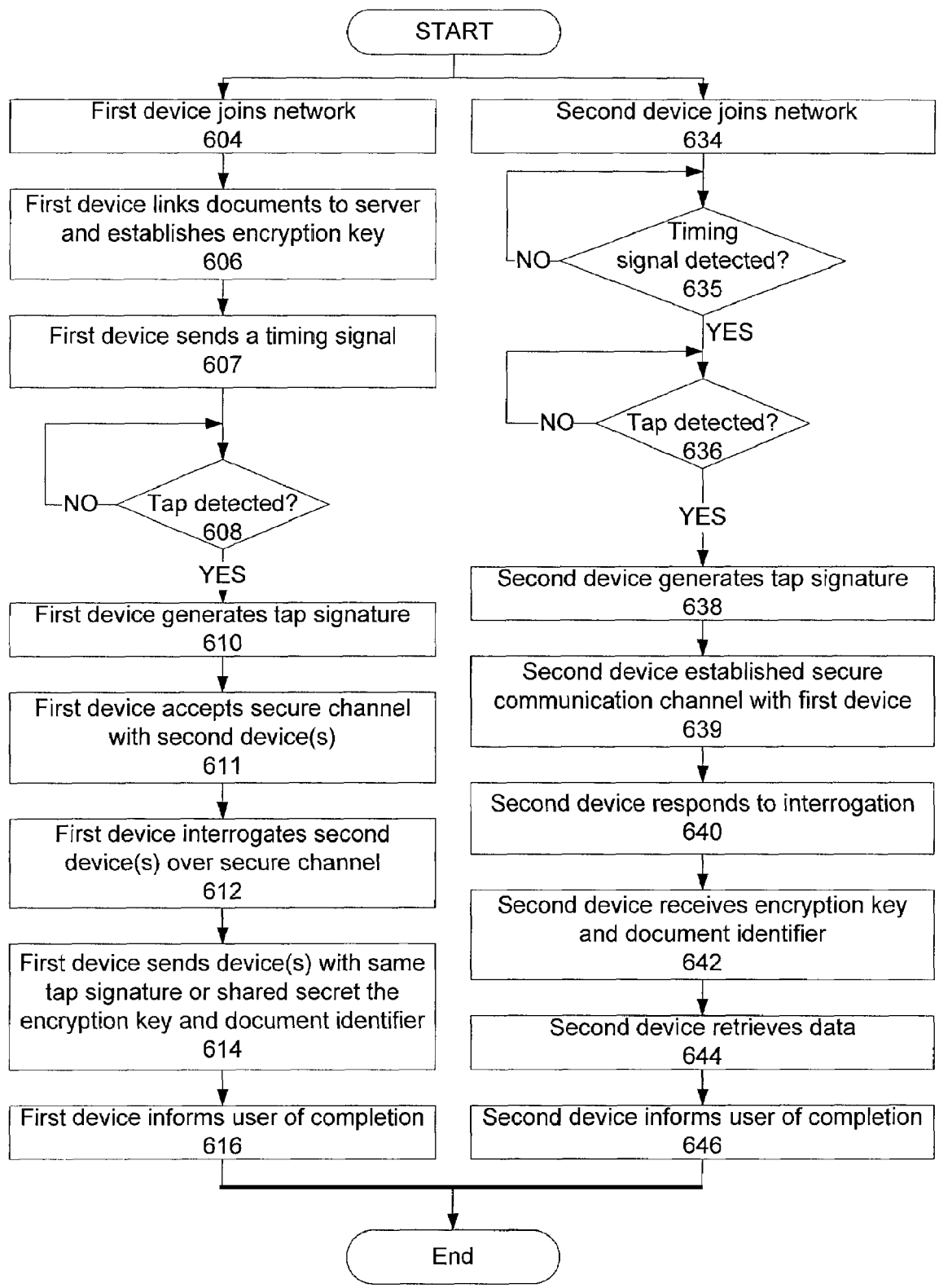
FIG. 6 is a flowchart of another embodiment of a method for transferring data between computing devices using a server in accordance with the present invention.

Referring now to FIG. 6, another embodiment of a method for transferring data between the first and second computing devices 102, 104 using the server 110 in accordance with the present invention is shown. This method includes the use of the server 110 for the reasons set forth above. The method includes a process that is operable on the first, sending device 102 and an independent process that is operable on the second, receiving device 104. Devices 102 and 104 are simply used by way of example to represent the interaction of any two (or more) devices including the motion detection mechanism of the present invention. FIG. 6 shows the process steps of the first, sending device 102 beside the process steps of the second, receiving device 104. This is done to show that there are certain dependencies between the processing on each device 102, 104; however, for the most part the steps can be performed independently and in various orders other than that shown in FIG. 6.

The process on the first device 102 begins with the first device joining 604 the network. This step is similar to the process described above with reference to FIGS. 4 and 5. Next, the first device 102 links 606 one or more documents to the server 110 and establishes an encryption key. The first device 102 links documents by loading encrypted versions of them onto the server 110. Then the method transmits 607 a timing or synchronization signal. In one alternate embodiment, the signal can be transmitted after the tap occurs. The shared secret comprises the difference between the tap time and the synchronization signal time and their order of occurrence. Then the method determines 608 whether a tap has been detected or sensed. If not the method loops to 608 and continues to test whether a tap signal has been detected. If a tap signal was detected, the method transitions to step 610, to calculate or generate a tap signature. The first device 102 then receives and accepts 611 requests from one or more second devices to establish a secure communication channel. After establishing the secure communication channel, the first device 102 interrogates 612 devices in its environment searching for the same tap signature or shared secret. As one or more devices 104 respond with a matching tap signature, the first device 102 sends 614 each device 104 the encryption key and a document identifier. In one embodiment, a document identifier is a URL which includes the name of a server and a path and filename indicating a document on that server. In another embodiment, a document identifier is a globally unique document ID that can be used to retrieve the document from any of a number of servers. Because encryption keys and identifiers are typically a very small number of bytes (<1 K), they can be sent virtually "instantly" to the receiving device 104 (100 μsec for a slow 10 Mbps interface, and much faster with more common faster interfaces). Gestures themselves can take seconds, so a 0.0001 second transfer time is imperceptible to the user. Those skilled in the art will recognize that there could also be various handshaking or acknowledgement signals exchanged to confirm receipt of the encryption key and the document identifier by the second, receiving device 104. The first device 102 then informs the user that data transfer is complete 616 such as by providing an audio or visual signal.

The process on the second device 104 begins with the second device 104 joining 634 the network. The method then determines 635 if a timing or synchronization signal has been detected. If not, the method loops to repeat step 635 and effectively monitors for a timing signal. Once a timing signal has been detected, the second device 104 starts a timer to measure the elapsed time between the timing signal and the tap. The method then determines 636 whether a tap has been detected. If not, the method loops to repeat step 636 and effectively monitors for a tap. In one embodiment, the tap may arrive before the timing signal is sent and so the second device 104 listens for the timing signal and the tap simultaneously and begins counting elapsed time from the occurrence of the first event (timing signal or tap) and stops counting at the occurrence of the second event (timing signal or tap). If the method detected a tap, then the second device 104 generates 638 a tap signature or a shared secret. The second device 104 then establishes a secure communication channel 639 with the device 102 that broadcast the timing signal. It should be understood that there could be a plurality of second devices. The second device 104 then listens 640 for the first device 102 sending an interrogation signal and responds 640 to the interrogation signal. The response signal from the second device 104 includes the tap signature or shared secret that the second device 104 generated. This allows the first device 102 to compare the tap signature received from the second device 104 with the one that the first device 104 generated. Then the second device 104 receives 642 from the first device 102 an encryption key and a document identifier. Using the encryption key and identifier, the second device 104 retrieves 644 data from the server 110. As has been noted above, this process is advantageous because the communication channel between the first and second devices 102, 104 can be closed and the second device can download the data from the server 110 independently from the first device 102. Once the data has been downloaded from the server 110, the second device 104 informs 646 the user that the transfer is complete and the process ends.

Additional Usage Scenarios

The present invention has been described above in one example usage scenario of two devices communicating with each other. However, those skilled in the art will recognize that there are a variety of additional usage scenarios in which the present invention may be employed to yield all the advantages that have been described above. Below a few additional example scenarios are listed and described, but this list is not exhaustive.

Another usage scenario describing how gesture sensing can be used to share documents is a one-to-many transmission (from one portable handheld device to a plurality of others). For example, devices may be stacked on top of each other, for easy transmission of a document to all devices in the stack. As long as all devices are powered on, they can identify themselves to each other and identify their positions. The device on the top, with its active document, can then send this document to all others in the stack. The physical indication to transfer could be when all the documents are "squared" up, such as aligning a stack of paper. Or the physical indication could be a "tap" on the top device, which all devices would sense, and then receive. In an alternate embodiment, all the devices may be positioned or laid upon the same surfaced. The locations of the devices can be determined by each other to be coplanar. By tapping or hitting the surface on which all the devices laid, the tap will be detected by all the devices will have the same signature and therefore can be used as has been described above as an encryption key to allow all the other devices on the same surface establish a secure communication and transfer the file.

Another usage scenario describing how gesture sensing can be used to share documents is from a host device to another device when the other device is moved. It is also possible to automatically configure another device (portable handheld device) to network with fixed computer systems, or other hosts. Once linked, documents can easily be shared with these fixed computer systems. One application of the present invention starts with the portable handheld device resting on a tabletop. When the portable handheld device is picked up, it senses that event, and interrogates the host computer. The host computer sends its active files to the portable device. This has the effect that a user can be working on a larger desktop computer, but when they have to "run off" for a meeting, they can pick up a portable handheld device, and the documents they were working on are automatically transferred to the portable device. Furthermore, this idea can be extended to also transfer working environment, open connections and other data and processes from the host system to the portable handheld device.

Those skilled in the art will recognize that while the present invention has been described in the context of transferring data from one computing device to another computing device, the present invention can be applied to the transfer of commands and data between any two devices that include the motion detection and communication mechanism of the present invention. For example, devices that receive the tap do not necessarily have to be other handheld or portable devices. They may be stationary devices, such as desktop computers or printers that can also detect the tap signature. This allows an easy way to transfer files to be printed or uploaded to other computer systems. For example, a user could simply tap a PDA against a printer and this would cause the devices to set up a secure communications channel, transfer a document from the PDA to the printer, and cause the document to printed. Such a capability could be added to multi-function peripherals (MFP) to allow document printing or uploading to a server via a MFP.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. An apparatus for enabling sharing of a file by a first computing device based on physical movement of the apparatus, the apparatus comprising:
an interface for coupling and communicating data to the first computing device;
an accelerometer having and generating an output providing information about acceleration of the accelerometer;
an analog-to-digital converter having an input and an output, the input coupled to the output of the accelerometer; and
a processor for generating a signature of the movement of the apparatus, the signature based on a time difference between a detection of a tap and a transmission of a synchronization signal and an order of occurrence of the detection of the tap and the transmission of the synchronization signal, the processor for transmitting an encrypted version of the file to a server and for sending a file pointer and an encryption key for accessing the file to a second computing device, the processor coupled to receive the output of the analog-to-digital converter and the processor coupled to the interface to output the signature of movement.

2. An apparatus for enabling sharing of a file by a first computing device based on physical movement of the apparatus, the apparatus comprising:
an interface for coupling and communicating data to the first computing device;
an accelerometer having and generating an output providing information about acceleration of the accelerometer;
an analog-to-digital converter having an input and an output, the input coupled to the output of the accelerometer;
a processor for generating a signature of the movement of the apparatus, the signature based on a time difference between a detection of a tap and a transmission of a synchronization signal and an order of occurrence of the detection of the tap and the transmission of the synchronization signal, the processor for transmitting an encrypted version of the file to a server and for sending a file pointer and an encryption key for accessing the file to a second computing device, the processor coupled to receive the output of the analog-to-digital converter and the processor coupled to the interface to output the signature of movement; and
a dongle housing the accelerometer, the analog-to-digital converter and the processor with the interface mounted for coupling to the first computing device.

3. A method for sending a file from a first device, the method comprising:
receiving selection of the file at the first device;
detecting a tap at the first device;
transmitting a synchronization signal at the first device;
generating a first signature at the first device, the first signature based on a time difference between the detection of the tap at the first device and the transmission of the synchronization signal and an order of occurrence of the detection of the tap and the transmission of the synchronization signal;
identifying a second device to which to transfer the file using the first signature; and making the file available to the second device by transmitting an encrypted version of the file to a server and sending a file pointer and an encryption key for accessing the file to the second device.

4. The method of claim 3, further comprising providing a cue at the first device to indicate completion of transferring the file.

5. The method of claim 3 wherein the tap is one from the group of contacting the first device with the second device and gesturing the first device toward the second device.

6. The method of claim 3, further comprising automatically connecting the first device to a network.

7. The method of claim 3, further comprising automatically identifying a local environment of the first device.

8. The method of claim 3, wherein identifying the second device to which to transfer the file using the first signature comprises determining whether the second device has a second signature similar to the first signature.

9. The method of claim 3, wherein transmitting an interrogation signal at the first device comprises requesting a second signature over a secure communication channel.

10. The method of claim 3, wherein identifying the second device to which to transfer the file using the first signature comprises receiving a response message including a second signature.

11. The method of claim 3, wherein making the file available comprises sending the file from the first device to the second device.

12. The method of claim 3, wherein the tap is a plurality of taps.

13. The method of claim 3, wherein the first device is a portable computing device and the second device is not portable.

14. The method of claim 3, wherein the second device is a portable computing device and the first device is not portable.

15. The method of claim 3, further comprising: positioning a plurality of devices in physical contact with each other; and contacting the first device with at least one of the plurality of devices to cause the tap.

16. A method for receiving a file from a first device at a second device, the method comprising:
   detecting a tap at the second device;
   detecting a synchronization signal at the second device, the synchronization signal transmitted by the first device;
   generating a first signature at the second device, the first signature based on a time difference between the detection of the tap at the second device and the detection of the synchronization signal and an order of occurrence of the detection of the tap and the detection of the synchronization signal;
   responding to an interrogation signal received at the second device;
   identifying the first device from which to transfer the file from the first signature; and
   retrieving the file to the second device by receiving a file pointer and an encryption key for accessing the file from the first device, and using the file pointer to retrieve the file from a server and using the encryption key to decrypt the file retrieved from the server.

17. The method of claim 16, further comprising providing a cue at the second device to indicate completion of retrieving the file.

18. The method of claim 16 wherein the tap is one from the group of contacting the first device with the second device and gesturing the first device toward the second device.

19. The method of claim 16, further comprising automatically connecting the second device to a network.

20. The method of claim 16, wherein responding to the interrogation signal at the second device comprises determining which device transmitted the interrogation signal.

21. The method of claim 16, wherein responding to the interrogation signal at the second device comprises establishing a secure communication channel with the first device and transmitting the first signature to the first device.

22. The method of claim 16, wherein retrieving the file to the second device comprises receiving the file from the first device.

23. The method of claim 16, wherein the tap is a plurality of taps.

24. The method of claim 16, wherein: the tap is movement of the second device; and the first device is a fixed host computer.

* * * * *